United States Patent [19]

Kolor

[11] 4,329,372
[45] May 11, 1982

[54] ETHYL 3-MERCAPTOPROPIONATE AS A GRAPE FLAVOR

[75] Inventor: Michael G. Kolor, Pearl River, N.Y.

[73] Assignee: General Foods Corporation, White Plains, N.Y.

[21] Appl. No.: 158,846

[22] Filed: Jun. 12, 1980

[51] Int. Cl.³ ............................................. A23L 1/235
[52] U.S. Cl. ................................................... 426/535
[58] Field of Search ........................................ 426/535

[56] References Cited

U.S. PATENT DOCUMENTS 3,061,511 10/1962 Dumesnil ............................ 424/266
3,277,143 10/1966 Tilles ................................... 260/455

OTHER PUBLICATIONS

Central Institute for Nutrition and Food Research, TNO Lists of Volatile Compounds in Foods, pp. 9.A.-1–9.A.10.

Furia et al., Fenaroli's Handbook of Flavor Ingredients, 2nd Ed., 1975, vol. 2, CRC Press, Cleveland, p. 179.

*Primary Examiner*—Joseph M. Golian
*Attorney, Agent, or Firm*—Thomas R. Savoie; Daniel J. Donovan

[57] ABSTRACT

Ethyl 3-mercaptopropionate is employed as a flavoring ingredient to provide a pleasant Concord grape flavor and aroma notes to foodstuffs. Ethyl 3-mercaptopropionate is used at a level of from 10 parts per billion to 70 parts per million by weight of the foodstuff, as consumed.

4 Claims, No Drawings

ETHYL 3-MERCAPTOPROPIONATE AS A GRAPE FLAVOR

TECHNICAL FIELD

There is a continuing search for compounds which can modify, enhance or otherwise improve the flavor and/or aroma of a foodstuff. This is particularly true in the area of fruit-flavored compounds which can be employed in a wide variety of foodstuffs such as candies, beverages, gelatin desserts, ices, etc. There are presently available many chemical compounds which have been used in the formulation of synthetic grape flavors, most notably methyl anthranilate. However, none of these compounds, either alone or in combination, are capable of producing a Concord grape flavor and aroma of high quality.

DISCLOSURE OF THE INVENTION

Ethyl 3-mercaptopropionate, alone or in combination with other flavoring materials, is useful to provide a high-quality Concord grape flavor and aroma to foodstuffs or to augment the existing grape flavor of a foodstuff or flavor composition.

As compiled in the text and supplements entitled, *Lists Of Volatile Compounds In Food,* published by Central Institute for Nutrition and Food Research TNO (Zeist-Netherlands), over 340 chemical compounds have already been identified as naturally-occurring components of grape flavor and aroma, and it is likely that many more volatile compounds actually exist in grapes. To date, however, ethyl 3-mercaptopropionate has not been disclosed as being naturally present in grapes. Via sophisticated gas chromatographic and mass spectographic analysis, the present inventor has been able to detect the presence of ethyl 3-mercaptopropionate in a 250-fold natural Concord grape essence. The level of ethyl 3-mercaptopropionate in this essence was too low to confirm the presence of the compound by the sulfur specific detection techniques available; however, the analysis demonstrated the level, if any, to be less than 0.17 parts per million (ppm). This level would translate to a level in single-fold natural essence of less than 0.68 parts per billion (ppb).

Ethyl 3-mercaptopropionate is a commercially-available (Polysciences Inc., Warrington, Pa.) chemical reagent which in its concentrated form possesses a strong, sulfury, skunky aroma. As disclosed in U.S. Pat. No. 3,277,143, ethyl 3-mercaptopropionate (otherwise known as ethyl β-mercaptopropionate) is useful in the preparation of chlorothioformates.

The use of ethyl 2-mercaptopropionate as a flavoring ingredient is, as disclosed in *Fenaroli's Handbook of Flavor Ingredients,* Second Edition, Vol. 2, P. 179 (CRC Press, 1975), known in the art. This compound, however, although possessing a fruity, grape-like aroma and flavor, does not possess all the highly-desirable Concord grape aroma and flavor notes of ethyl 3-mercaptopropionate. According to this invention, ethyl 3-mercaptopropionate is employed at a level of from 10 ppb to 70 ppm in a food product as consumed. The preferred levels being at about 100 ppb to 50 ppm. Typical use levels for various food products employing ethyl 3-mercaptopropionate as part of a flavor formulation and when used as a sole flavoring ingredient are given in Table 1. All parts are by weight of the food product and the ranges refer to the level of ethyl 3-mercaptopropionate present in the product as consumed.

TABLE 1

| Product | Used In Flavor Composition (ppm) | Used Alone (ppm) |
| --- | --- | --- |
| Beverages | 0.1–0.5 | 1–5 |
| Ice Cream | 0.1–0.5 | 1–5 |
| Candy | 1.0–5.0 | 10–50 |
| Baked Goods | 2.0–6.0 | 20–60 |
| Chewing Gum | 3.0–7.0 | 30–70 |
| Gelatin Desserts | 0.2–1.0 | 2–10 |
| Jellied Products | 0.3–2.0 | 3–20 |
| Syrups | 0.4–3.0 | 4–30 |

A typical artificial Concord grape flavor formulation in a propylene glycol carrier, suitable for use in a beverage or a powdered beverage drink mix, is set forth in Table 2. Use level for this formulation would typically be about 1 gram per liter of finished beverage.

TABLE 2

| Ingredient | Weight % |
| --- | --- |
| Ethyl Acetate | 15.00 |
| Methyl Anthranilate | 14.00 |
| Ethyl Oxyhydrate | 7.75 |
| Cinnamic Alcohol | 4.00 |
| Ethyl Butyrate | 2.00 |
| Ethyl Pelargonate | 2.00 |
| Amyl Valerate | 2.00 |
| Beta-Methyl Naphthyl Ketone | 1.00 |
| Oil of Orange (5-fold) | 0.75 |
| Cinnamyl Propionate | 0.50 |
| Glacial Acetic Acid | 0.50 |
| Rhodinyl Acetate | 0.25 |
| Ethyl 3-Mercaptopropionate (10% in propylene glycol) | 0.25 |
| Propylene Glycol | 50.00 |
| | 100.00 |

This formulation will produce a beverage having a highly-desirable Concord grape flavor and aroma. Substitution of ethyl 2-mercaptopropionate, at its optimum level, for the ethyl 3-mercaptopropionate in the formulation of Table 2 will yield a beverage having a significantly less desirable Concord grape flavor and aroma.

Having thus described the invention, what is claimed is:

1. A process for imparting a Concord grape flavor to a foodstuff which comprises adding thereto a flavoring composition consisting essentially of synthetically-produced, substantially-pure ethyl 3-mercaptopropionate in an amount sufficient to effect a level of said compound in the foodstuff, as consumed, of from 100 parts per billion to 50 parts per million by weight.

2. The process of claim 1 wherein the foodstuff is a powdered beverage mix.

3. A process of augmenting the grape flavor of a foodstuff with a Concord grape note which comprises adding thereto an amount of synthetically-produced, substantially-pure ethyl 3-mercaptopropionate sufficient to effect a level of said compound in the foodstuff, as consumed, of 100 parts per billion to 50 parts per million by weight.

4. The method of claim 3 wherein the foodstuff has added thereto an effective amount of methyl anthranilate.

* * * * *